(12) United States Patent
Rabe (10) Patent No.: US 11,263,510 B2
(45) Date of Patent: Mar. 1, 2022

(54) METHOD FOR PERFORMING MEASUREMENTS OF DENDRITIC STRUCTURES FOR ALL MAGNIFICATIONS AND CAMERA RESOLUTIONS OF MICROSCOPES

(71) Applicant: GM GLOBAL TECHNOLOGY OPERATIONS LLC, Detroit, MI (US)

(72) Inventor: Adam P. Rabe, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 39 days.

(21) Appl. No.: 16/929,238

(22) Filed: Jul. 15, 2020

(65) Prior Publication Data

US 2022/0019865 A1    Jan. 20, 2022

(51) Int. Cl.
*G06M 11/00* (2006.01)
*G06T 7/00* (2017.01)
*G06T 7/11* (2017.01)

(52) U.S. Cl.
CPC .......... *G06M 11/00* (2013.01); *G06T 7/0004* (2013.01); *G06T 7/11* (2017.01); *G06T 2207/10056* (2013.01); *G06T 2207/30136* (2013.01)

(58) Field of Classification Search
CPC .......... G06T 2207/20224; G06T 11/60; G06K 9/4604; G06K 2209/05
See application file for complete search history.

(56) References Cited

U.S. PATENT DOCUMENTS

| | | | | |
|---|---|---|---|---|
| 6,815,414 B2 * | 11/2004 | Chowers | ................... | A61P 1/04 514/12.3 |
| 8,090,177 B2 * | 1/2012 | Venkataraman | .......... | G06T 7/11 382/130 |
| 8,349,575 B2 * | 1/2013 | McKenzie | ............. | C07K 16/28 435/7.24 |
| 8,597,946 B2 * | 12/2013 | Mule | .................... | C12N 5/0639 435/372 |
| 8,620,043 B2 * | 12/2013 | Kitamura | .............. | G06T 7/0012 382/128 |
| 8,942,462 B2 | 1/2015 | Wang et al. | | |
| 9,696,312 B2 * | 7/2017 | Suciu-Foca | ........ | A61K 47/6801 |

* cited by examiner

*Primary Examiner* — Yosef Kassa (57) ABSTRACT

A system includes a processor and memory storing instructions that when executed by the processor configure the processor to receive an image of a metallographic sample of a product from a microscope, the image including dendritic structures in the metallographic sample; select a portion of the image; and perform morphological operations on the selected portion of the image to transform the image. The instructions configure the processor to overlay a plurality of concentric circles on the transformed image, measure circumferences of the circles, and count the number of intercepts of the circles and boundaries of the dendritic structures in the transformed image. The instructions configure the processor to determine parameters of the dendritic structures based on the measured circumferences and the number of intercepts. The instructions configure the processor to determine structural properties of the product based on the parameters of the dendritic structures.

20 Claims, 4 Drawing Sheets

METHOD FOR PERFORMING MEASUREMENTS OF DENDRITIC STRUCTURES FOR ALL MAGNIFICATIONS AND CAMERA RESOLUTIONS OF MICROSCOPES

INTRODUCTION

The information provided in this section is for the purpose of generally presenting the context of the disclosure. Work of the presently named inventor, to the extent it is described in this section, as well as aspects of the description that may not otherwise qualify as prior art at the time of filing, are neither expressly nor impliedly admitted as prior art against the present disclosure.

The present disclosure relates generally to metallographic measurement methods and more particularly to an image analysis method that can be used to perform mean linear dendrite spacing (MLDS) measurements of dendritic structures for all magnifications and camera resolutions of microscopes.

In metallurgy, a dendrite is a tree-like structure of crystals that grows as molten metal solidifies, with its shape produced by faster growth along energetically favorable crystallographic directions. Dendritic growth impacts material properties. Dendrites form in unary (one-component) systems as well as multi-component systems when molten material is undercooled (or super-cooled) below a freezing point of a solid. Initially, a spherical solid nucleus grows in an undercooled melt. As the sphere grows, spherical morphology becomes unstable, and the shape of the solid becomes perturbed. The shape begins to exhibit preferred growth directions of the crystal. The growth directions may be due to anisotropy in surface energy of the solid-liquid interface, the ease of attachment of atoms to the interface on different crystallographic planes, or both. In metallic systems, interface attachment kinetics is usually negligible, and the solid attempts to minimize the area of those surfaces with the highest surface energy. The dendrite thus exhibits an increasingly sharper tip as it grows. If the anisotropy is sufficiently large, the dendrite may present a faceted morphology. A microstructural length scale is determined by interplay or balance between surface energy and temperature gradient in the liquid at the interface, which drives the heat/solute diffusion.

As solidification progresses, an increasing number of atoms lose their kinetic energy, making the process exothermic. For a pure material, latent heat is released at the solid-liquid interface so that the temperature remains relatively constant until the melt completely solidifies. The growth rate of the resultant crystalline substance depends on the speed with which the latent heat can be conducted away. A dendrite growing in an undercooled melt can be approximated as a parabolic needle-like crystal that grows in a shape-preserving manner at a relatively constant velocity. Nucleation and growth determine the grain size in solidification while competition between adjacent dendrites decides primary spacing in columnar growth.

Generally, if the melt is cooled slowly, nucleation of new crystals is less than at large undercooling, and the dendritic growth results in dendrites of a large size. Conversely, a rapid cooling cycle with large undercooling increases the number of nuclei and reduces the size of the resulting dendrites and often leads to small grains. Smaller dendrites generally lead to higher ductility of a product. One application where dendritic growth and resulting material properties can be seen is a welding process. The dendrites are also common in cast products, where they may become visible by etching of a polished specimen.

SUMMARY

A system comprises a processor and memory storing instructions that when executed by the processor configure the processor to receive an image of a metallographic sample of a product from a microscope, the image including dendritic structures in the metallographic sample; select a portion of the image; and perform morphological operations on the selected portion of the image to transform the image. The instructions configure the processor to overlay a plurality of concentric circles on the transformed image, measure circumferences of the circles, and count the number of intercepts of the circles and boundaries of the dendritic structures in the transformed image. The instructions configure the processor to determine parameters of the dendritic structures based on the measured circumferences and the number of intercepts. The instructions configure the processor to determine structural properties of the product based on the parameters of the dendritic structures.

In another feature, a process used to manufacture the product is selectively adjusted based on the determined structural properties.

In another feature, a composition of material used to manufacture the product is selectively adjusted based on the determined structural properties.

In another feature, the instructions configure the processor to determine the parameters independent of a magnification of the microscope.

In another feature, the instructions configure the processor to determine the parameters independent of a resolution of a camera used to capture the image.

In another feature, the instructions configure the processor to adjust one or more of the circumferences based on a distribution of the dendritic structures in the selected portion of the image.

In another feature, the parameters include a dendritic cell spacing for the metallographic sample, and the instructions configure the processor to determine the dendritic cell spacing by dividing a sum of the circumferences by the number of intercepts.

In another feature, the parameters include a mean linear dendritic spacing for the metallographic sample, and the instructions configure the processor to determine the mean linear dendritic spacing based on the circumferences and the number of intercepts.

In another feature, the parameters include a mean linear dendritic spacing for the metallographic sample, and the instructions configure the processor to determine the mean linear dendritic spacing based on the dendritic cell spacing.

In another feature, the parameters include a mean linear dendritic spacing for the metallographic sample, and the instructions configure the processor to determine the mean linear dendritic spacing based on the dendritic cell spacing and an area of the selected portion of the image.

In still other features, a system comprises a plurality of microscopes having different magnifications and including cameras having different resolutions, and a computing device. The computing device is configured to receive an image of a metallographic sample of a product captured by one of the cameras of any one of the microscopes at any one of the magnifications. The image includes dendritic structures in the metallographic sample. The computing device is configured to select a portion of the image, and perform morphological operations on the selected portion of the image to transform the image. The computing device is configured to overlay a plurality of concentric circles on the transformed image, measure circumferences of the circles, and count the number of intercepts of the circles and boundaries of the dendritic structures in the transformed image. The computing device is configured to determine parameters of the dendritic structures based on the measured circumferences and the number of intercepts, and determine structural properties of the product based on the parameters of the dendritic structures.

In another feature, a process used to manufacture the product is selectively adjusted based on the determined structural properties.

In another feature, a composition of material used to manufacture the product is selectively adjusted based on the determined structural properties.

In another feature, the computing device is configured to determine the parameters independent of the magnifications of the microscopes.

In another feature, the computing device is configured to determine the parameters independent of the resolutions of the cameras.

In another feature, the computing device is configured to adjust one or more of the circumferences based on a distribution of the dendritic structures in the selected portion of the image.

In another feature, the parameters include a dendritic cell spacing for the metallographic sample, and the computing device is configured to determine the dendritic cell spacing by dividing a sum of the circumferences by the number of intercepts.

In another feature, the parameters include a mean linear dendritic spacing for the metallographic sample, and the computing device is configured to determine the mean linear dendritic spacing based on the circumferences and the number of intercepts.

In another feature, the parameters include a mean linear dendritic spacing for the metallographic sample, and the computing device is configured to determine the mean linear dendritic spacing based on the dendritic cell spacing.

In another feature, the parameters include a mean linear dendritic spacing for the metallographic sample, and the computing device is configured to determine the mean linear dendritic spacing based on the dendritic cell spacing and an area of the selected portion of the image.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Measurements of dendritic structures in metallographic samples of products provide information about structural properties (also called mechanical properties) and mechanical integrity of the products manufactured using processes such as molding, casting, etc. For example, the measurements can be used to estimate stress handling capabilities of the products. The measurements can be used to identify structural defects in the products and in the processes used to manufacture the products. The measurements can be used to determine the rate of solidification and rate of cooling during casting processes. The measurements can be used to adjust the processes to minimize or eliminate the defects in the products manufactured using the processes. Additionally or alternatively, the measurements can also be used to alter/adjust the composition of the material used to manufacture the product.

The measurements are typically performed using microscopes. Images of dendritic structures in a sample of a product are captured by cameras coupled to the microscopes. The images are analyzed using an application program running on a computing device such as a personal computer, and measurements such as dendritic cell spacing (DCS) and mean linear dendritic spacing (MLDS) in the sample are performed.

Different microscopes have different magnifications and camera resolutions. The application program typically comprises a separate image analysis and measurement routine for every microscope magnification and camera resolution combination, where a routine is a subset of the application program that can be called repeatedly to perform measurements. A separate image analysis and measurement routine is used for every microscope magnification and camera resolution combination due to differences in measurement resolutions.

The image analysis routine typically involves performing measurements by overlaying five concentric circles on the microscopic image of the sample and measuring the number of intercepts between the circles and boundaries of the dendritic structures. The circumferences of these circles are predetermined and are different for each microscope magnification and camera resolution combination (i.e., for each image analysis routine). This can cause measurement errors if an incorrect image analysis measurement routine is selected or if the measurement resolution is changed due to a microscope calibration or equipment change.

The present disclosure provides an automated image analysis measurement method that is universal for all microscope magnification and camera resolution combinations. Using a single routine for all microscope magnification and camera resolution combinations eliminates the need to select a routine based on the microscope magnification and camera resolution combination and consequent measurement error. The image analysis measurement routine of the present disclosure is universal for all microscope magnification and camera combinations because the circumference of the overlaid concentric circles is not predetermined but is measured when measurements are performed on a sample, and the measured circumferences are used in the DCS measurements performed for the sample.

Specifically, the present disclosure provides a single, universal measurement method (i.e., a single universal routine in the application program) that can perform the measurements using any microscope regardless of the microscope magnification and camera resolution. That is, the measurement method according to the present disclosure is universal in the sense that the measurement method can work with any microscope and is independent of the microscope magnification and camera resolution. Further, the measurement method is unaffected by a change in the measurement resolution due to calibration or equipment change.

A single routine for performing the measurements can work with microscopes having different magnifications and camera resolutions because the measurement method does not use circles having predetermined or known circumferences. The measurement method does not use the same predetermined circumferences for every measurement performed by a microscope. Instead, the measurement method actually measures the circumferences of the circles after the circles are overlaid on the sample during each measurement. Since the circumferences of the circles are measured and used to compute dendritic cell spacing (DCS) and mean linear dendritic spacing (MLDS) during each measurement, the error that can be introduced due to using circles of known circumferences is eliminated, and a single routine can be used to perform the measurements regardless of the microscope magnification and camera resolution.

Further, since the circumferences of the circles are measured during each measurement, the measurement method provides the freedom to use circles of any dimensions and is not restricted to using circles of predefined dimensions. This makes the measurement method flexible in that the circles can be adjusted (expanded or shrunk) depending on the dendrite density or dendrite distribution in the samples. The circumference of one or more circles can be changed or adjusted based on a distribution of dendritic structures in a portion of the sample selected for measurement. Furthermore, since the circumferences of the circles are measured and since the measurement method is independent of the microscope magnification, the measurement method provides the freedom to select any magnification on the microscope depending on the dendrite density or dendrite distribution in the samples. Thus, the measurement method of the present disclosure is not only universal but also flexible. These and other features of the measurement method of the present disclosure are described below in detail.

Throughout the present disclosure the term routine is used as follows. In computer programming, routine and subroutine are general and nearly synonymous terms for any sequence of code that is intended to be called and used repeatedly during the executable of a program. In other words, a routine is a set of instructions or compiled code that is executable by a processor and that is a portion or subset of an application program.

Figure 1A:
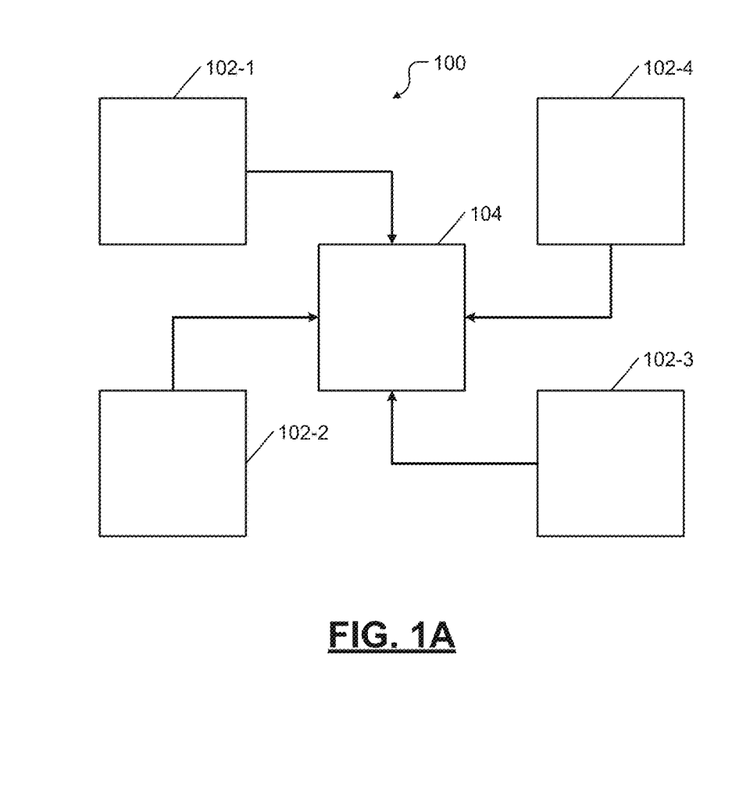
FIG. 1A shows a system comprising a computing device and a plurality of microscopes for performing measurements of dendritic structures.

FIG. 1A shows a system 100 for performing DCS and MLDS measurements on metallographic samples. The system 100 comprises a plurality of microscopes 102-1, 102-2, 102-3, 102-4, and so on (collectively microscopes 102). Each of the microscopes 102 may have a different magnification and camera resolution. For completeness, a simplified schematic of one of the microscopes 102 is shown and described below with reference to FIG. 1B.

The system 100 comprises a computing device 104. For completeness, a simplified block diagram of an example of the computing device 104 is shown and described below with reference to FIG. 2. The computing device 104 executes an application program. The application program comprises a single routine that is used with all the microscopes 102 to perform measurements on metallographic samples. The application program uses the same routine to perform the measurements when any of the microscopes 102 is used to perform the measurements.

Figure 1B:
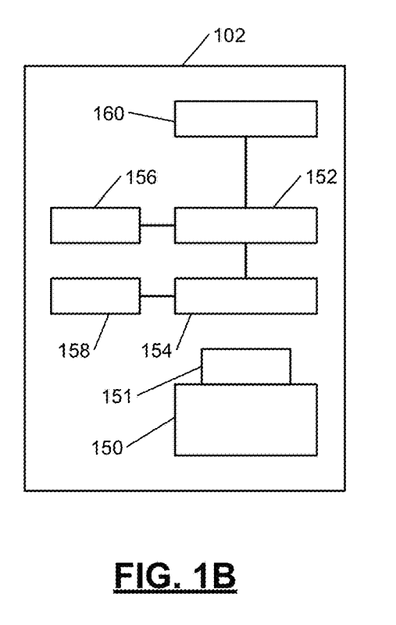
FIG. 1B shows a simplified schematic of the microscopes of FIG. 1A.

FIG. 1B shows a simplified schematic of one of the microscopes (hereinafter the microscope) 102. Each of the microscope 102 comprises a stage holder 150 to hold a metallographic sample (hereinafter sample) 151. An eyepiece 152 is used to view the sample 151 through one of the lens 154. One or more focus knobs 156 (e.g., coarse and fine focus knobs) is used to adjust focus while viewing the sample 151 through the eyepiece 152. A magnification selector 158 is used to select magnification of the microscope 102 (e.g., by selecting a different one of the lenses 154). The application program on the computing device 104 uses the same routine to perform the measurements regardless of the magnification selected. A camera 160 captures an image of the sample 151 being viewed through the eyepiece 152. The application program on the computing device 104 uses the same routine to perform the measurements regardless of the resolution of the camera 160.

While not shown, the microscopes 102 may also comprise a wired or wireless communication interface to communicate with (e.g., to transmit an image of the sample 151 to) the computing device 104. For example, the camera 160 may include the communication interface. In some examples, the camera 160 may be portable. That is, the camera 160 may be replaced by another camera having a different resolution. The application program on the computing device 104 uses the same routine to perform the measurements with either camera.

Figure 2:
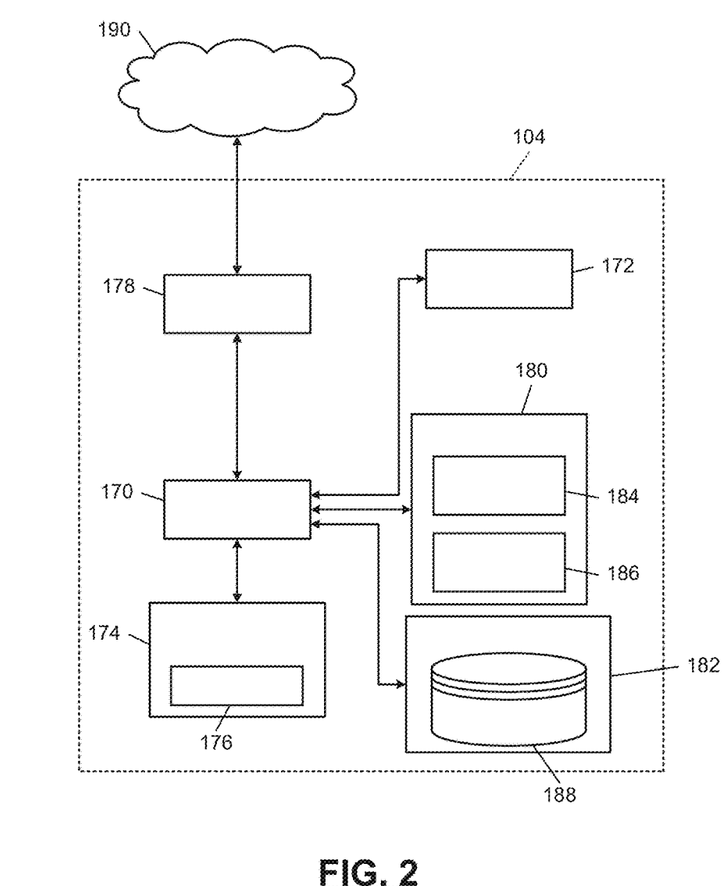
FIG. 2 shows a simplified block diagram of the computing device of FIG. 1A.

FIG. 2 shows an example of the computing device 104. The computing device 104 includes one or more CPUs or processors 170, one or more input devices 172 (e.g., a keypad, touchpad, mouse, and so on), a display subsystem 174 including a display 172, a network interface 178, a memory 180, and a bulk storage 182. The memory 180 may include volatile or nonvolatile memory, cache, or other type of memory. The bulk storage 182 may include flash memory, one or more hard disk drives (HDDs), or other bulk storage device.

The processor 170 of the computing device 104 may execute an operating system (OS) 184 and one or more application programs (i.e., applications) 186. The applications 186 may include an application that implements the measurement method (i.e., an application including the universal routine) of the present disclosure. The bulk storage 182 may store one or more databases 188 that store data structures used by the applications 186 to perform respective functions.

The network interface 178 connects the computing device 104 to a network 190. For example, the network interface 178 may include a wired interface (e.g., an Ethernet interface) and/or a wireless interface (e.g., a Wi-Fi, Bluetooth, near field communication (NFC), cellular, or other wireless interface). The network 190 may include a local area network (LAN), a wide area network (WAN) such as the Internet, a cellular network, or other type of network (collectively shown as the network 190).

Figure 3A:
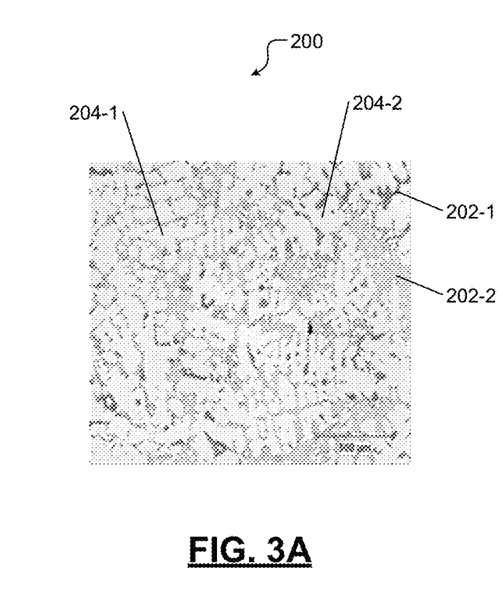
FIG. 3A shows a micrograph of a metallographic sample viewed under one of the microscopes of FIG. 1A.
Figure 3B:
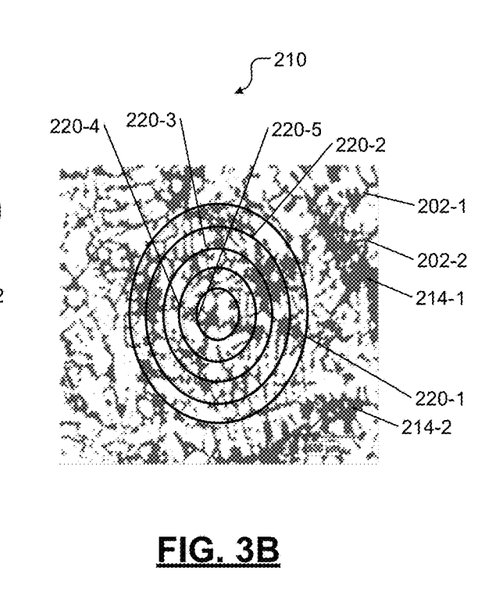
FIG. 3B shows a transformed micrograph after successive morphological operations are performed on the micrograph of FIG. 3A and shows a plurality of circles overlaid on the transformed micrograph.

FIGS. 3A and 3B show an example of an image 200 of a sample (e.g., the sample 151 shown in FIG. 1B). The image 200 is shown to illustrate the measurement method of the present disclosure. In FIG. 3A, the image 200 is shown as a micrograph or a grayscale bit plane of the dendritic structure of the sample 151 as viewed from the eyepiece (e.g., element 152 shown in FIG. 1B) of the microscope 102 and as captured by a camera (e.g., the camera 160 shown in FIG. 1B) coupled to the microscope 102.

In FIG. 3A, elements with three shades of gray are shown: light (white), darker, and darkest (black). The relatively darker and darkest elements similar to those identified at 202-1 and 202-2 (collectively elements 202) are called non-dendritic or eutectic regions (hereinafter eutectic areas 202), and the relatively light elements similar to those identified at 204-1 and 204-2 (collectively elements 204) are called dendritic or non-eutectic regions (hereinafter non-eutectic areas 204).

Before placing the sample 151 on a stage holder (e.g., element 150 shown in FIG. 1B) of the microscope 102, the sample 151 is prepared and polished to reveal dendritic structure such as that shown in the image 200. The sample 151 is then placed on the stage holder (e.g., element 150 shown in FIG. 1B) of any one of the microscopes 102. A magnification suitable for observing the sample 151 is selected on the microscope 102. A camera (e.g., the camera 160 shown in FIG. 1B) having a desired resolution is coupled to the microscope 102.

In the application 186 running on the computing device 104, the routine for performing the measurements of the sample is initiated. Since the routine is a subset of the application 186, all operations described as being performed by the routine throughout the present disclosure can be attributed to and deemed as performed by the application 186. The image (i.e., a micrograph) 200 of the sample 151 captured by the camera 160 of the microscope 102 is received from the microscope 102 (or directly from the camera 160 coupled to the microscope 102). The image 200 is loaded/imported into the routine running on the computing device 104 to perform the measurements.

Before performing the measurements, the routine running on the computing device 104 performs successive dilation and erosion smoothing operations on the image 200. These operations are morphological operations. The image 200 includes numerous eutectic areas (i.e., inter-dendritic areas or areas between dendrites 204) 202 and numerous non-eutectic areas 204. The eutectic areas 202 include particles or pixels that are not solid cohesive masses. By expanding the bit plane of the image 200 and by performing the morphological operations successively, these discrete particles in the eutectic areas 202 are combined and converted into solid objects to separate the eutectic areas 202 and the non-eutectic areas 204.

The corresponding solid objects formed by performing the morphological operations on the eutectic areas 202 are shown at 214-1, 214-2 and so on (collectively solid objects 214) in the transformed image 210 in FIG. 3B. Accordingly, as explained below, the intersections between circles and the particles in the eutectic areas 202 are not measured, but rather the intersections between the circles and the boundaries of the eutectic areas 202 are measured.

After performing the morphological operations, the routine running on the computing device 104 overlays a plurality of (e.g., five) concentric circles on the transformed image 210 as shown in FIG. 3B. The routine measures circumferences of the circles and generates a sum L of the circumferences. Each circle intersects the eutectic areas 202 and boundaries of the solid objects 214 at numerous points called intercepts. Examples of such intercepts are shown at 220-1, 220-2, 220-3, 220-4, 220-5, and so on (collectively intercepts 220) in FIG. 3B. The routine counts the total number N of the intercepts 220 in the transformed image 210.

The routine then computes dendritic cell spacing (DCS) as DCS=L/N. The routine measures an area percent V % of the eutectic region in the transformed image 210. Using the DCS and the area percent V %, the routine computes the mean linear dendrite spacing (MLDS) as MLDS=DCS*(1−(V %)). The MLDS is used to estimate structural and mechanical properties of the sample 151.

In some instances, the sample 151 is moved on the stage holder 150 of the microscope 102 to a different position, another image 200 is captured of a different eutectic region of the sample 151, and the above measurement process is repeated. Thus, the sample 151 can be moved multiple times, and multiple DCS and MLDS measurements of different eutectic areas of the sample 151 can be obtained using the routine.

Subsequently, the application 186 (or the routine) can perform a statistical analysis of the multiple measurements to identify and eliminate any anomalies that may occur in any of the multiple measurements (e.g., due to variations or irregular dendritic distribution in some of the eutectic regions of the sample 151). The application 186 can also use the statistical analysis to identify any patterns (e.g., faults or structural weaknesses) in some of the eutectic regions of the sample 151 examined. Such information can be useful in further determining the structural properties of the sample 151 and/or confirming the structural properties determined from the DCS and MLDS measurements.

Figure 4A:
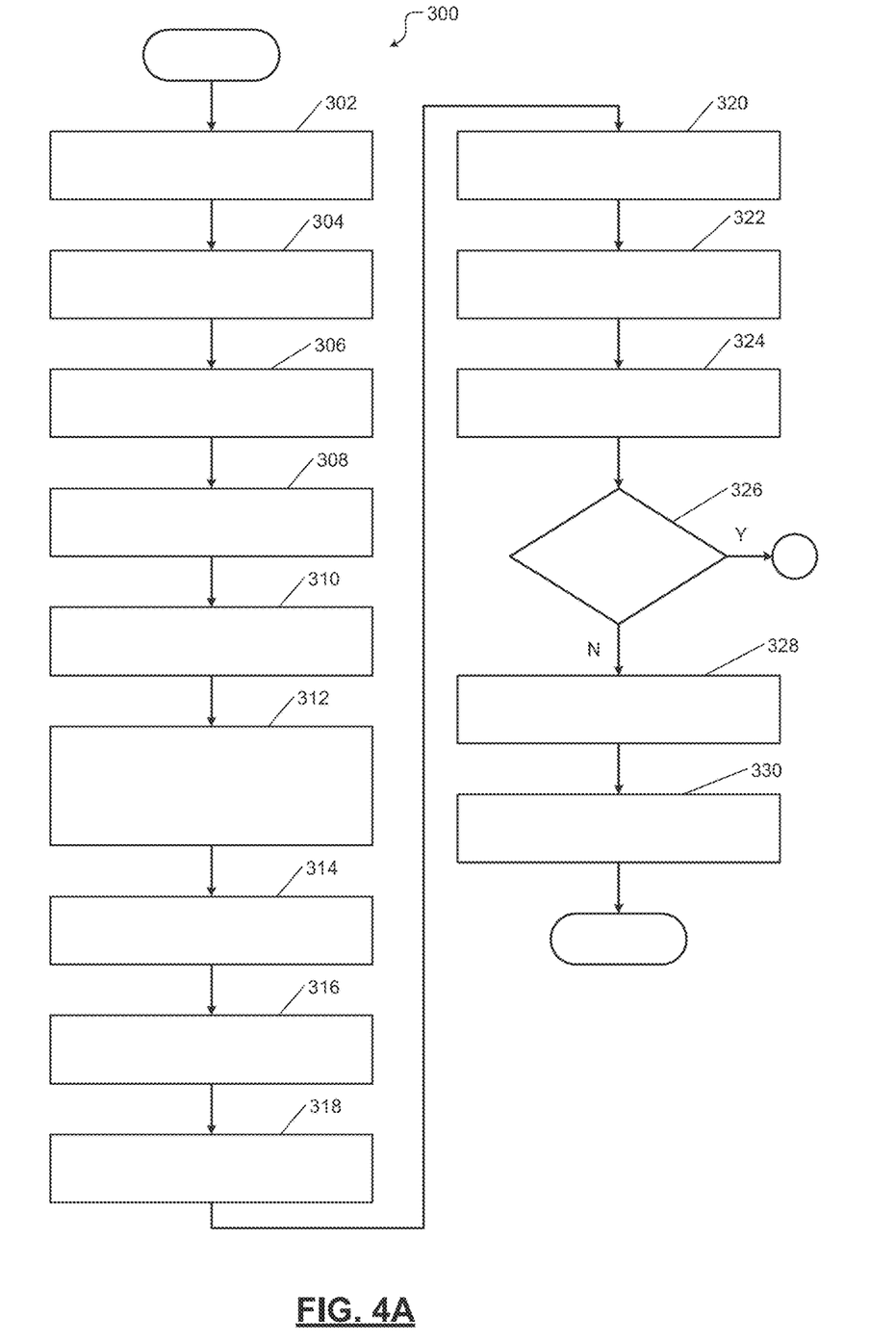
FIGS. 4A and 4B show a method of performing measurements of dendritic structures in the transformed micrograph of FIG. 3B using the overlaid circles according to the present disclosure.
Figure 4B:
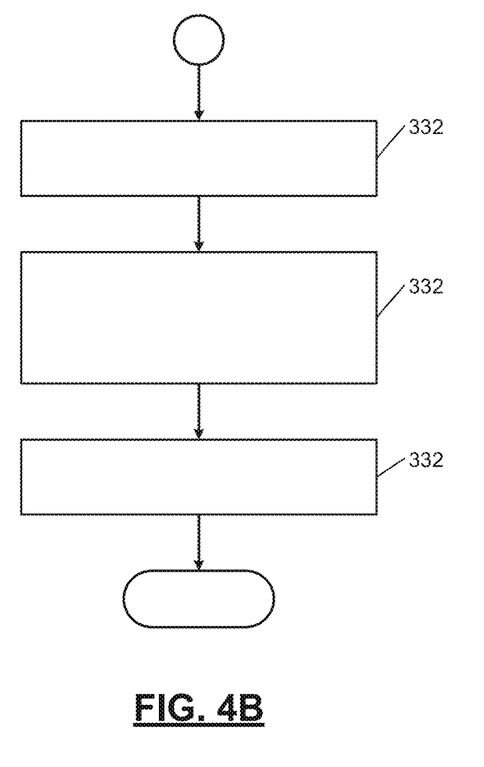

FIG. 4 shows a method 300 for performing the DCS and MLDS measurements according to the present disclosure. For example, the method 300 can be performed by a computing device (e.g., the computing device 104 shown in FIGS. 1A and 2). For example, the method 300 can be implemented in an application program (e.g., the application 186 shown in FIG. 2).

At 302, a metallographic sample (e.g., the sample 151 shown in FIG. 1B) of a product manufactured using a process such as casting, molding, and so on is prepared and polished to reveal dendritic structure. At 304, the sample is placed on a stage holder (e.g. element 150 shown in FIG. 1B) of a microscope (e.g., any one of the microscopes 102 shown in FIG. 1A, regardless of the microscope magnification and the resolution of the microscope camera).

At 306, a desired microscope magnification is selected. At 308, a desired measurement area (dendritic regions) of the sample is selected. At 310, an image of the selected area (e.g., image 200 shown in FIG. 3A) is captured using a camera coupled to the microscope (e.g., the camera 160 shown in FIG. 1B).

At 312, the method 300 performs successive dilation and erosion smoothing operations on the image to convert pixels in eutectic areas (e.g., elements 204 shown in FIG. 3A) of the image into solid objects (e.g., elements 214 shown in FIG. 3B). At 314, the method 300 overlays a plurality of (e.g., five) concentric circles on the transformed image (e.g., circles shown in the transformed image 210 in FIG. 3B). At 316, the method measures circumferences of the circles and generates a sum L of the circumferences of the circles. At 318, the method 300 counts the number N of intercepts between each circle and the dendrites and the boundaries of the solid objects in the transformed image.

At 320, the method measures the area percent V % of the selected eutectic region in the transformed image. At 322, the method 300 determines the dendritic cell spacing (DCS) for the dendrites in the selected eutectic region as DCS=L/N. At 324, the method 300 determines the mean linear dendrite spacing for the dendrites (MLDS) for the dendrites in the selected eutectic region as MLDS=DCS*(1−(V %)).

At 326, the method 300 allows for electing whether to perform statistical analysis by obtaining additional measurements of the sample. The method 300 proceeds to 328 if statistical analysis is not desired. At 328, the method 300 estimates structural and mechanical properties of the sample based on the DCS and MLDS measurements. At 330, the method 300 selectively adjusts the process of manufacturing the product and/or the composition of the material used to manufacture the product based on the DCS and MLDS measurements, and the method 300 ends.

At 326, if statistical analysis is desired and elected, the method 300 proceeds to 332. At 332, the method 300 moves the sample P times, where P>1; and after moving the sample each time, the method 300 repeats steps 306-324 to obtain P sets of measurements of DCS and MLDS for the sample.

At 334, the method 300 performs statistical analyses on the P sets of measurements to eliminate any anomalies that may occur in any of the P sets of measurements and to identify any patterns in the P sets of measurements to further determine/confirm the structural properties and mechanical integrity of the sample. At 336, the method 300 selectively adjusts the process of manufacturing the product and/or the composition of the material used to manufacture the product based on the statistical analysis, and the method 300 ends.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term code, as used herein, may include software, firmware, and/or microcode, and may refer to programs, routines, functions, classes, data structures, and/or objects. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a processor; and
memory storing instructions that when executed by the processor configure the processor to:
receive an image of a metallographic sample of a product from a microscope, the image including dendritic structures in the metallographic sample;
select a portion of the image;
perform morphological operations on the selected portion of the image to transform the image;
overlay a plurality of concentric circles on the transformed image;
measure circumferences of the circles;
count the number of intercepts of the circles and boundaries of the dendritic structures in the transformed image;
determine parameters of the dendritic structures based on the measured circumferences and the number of intercepts; and
determine structural properties of the product based on the parameters of the dendritic structures.

2. The system of claim 1 wherein a process used to manufacture the product is selectively adjusted based on the determined structural properties.

3. The system of claim 1 wherein a composition of material used to manufacture the product is selectively adjusted based on the determined structural properties.

4. The system of claim 1 wherein the instructions configure the processor to determine the parameters independent of a magnification of the microscope.

5. The system of claim 1 wherein the instructions configure the processor to determine the parameters independent of a resolution of a camera used to capture the image.

6. The system of claim 1 wherein the instructions configure the processor to adjust one or more of the circumferences based on a distribution of the dendritic structures in the selected portion of the image.

7. The system of claim 1 wherein the parameters include a dendritic cell spacing for the metallographic sample and wherein the instructions configure the processor to determine the dendritic cell spacing by dividing a sum of the circumferences by the number of intercepts.

8. The system of claim 1 wherein the parameters include a mean linear dendritic spacing for the metallographic sample and wherein the instructions configure the processor to determine the mean linear dendritic spacing based on the circumferences and the number of intercepts.

9. The system of claim 7 wherein the parameters include a mean linear dendritic spacing for the metallographic sample and wherein the instructions configure the processor to determine the mean linear dendritic spacing based on the dendritic cell spacing.

10. The system of claim 7 wherein the parameters include a mean linear dendritic spacing for the metallographic sample and wherein the instructions configure the processor to determine the mean linear dendritic spacing based on the dendritic cell spacing and an area of the selected portion of the image.

11. A system comprising:
a plurality of microscopes having different magnifications and including cameras having different resolutions; and
a computing device configured to:
receive an image of a metallographic sample of a product captured by one of the cameras of any one of the microscopes at any one of the magnifications, the image including dendritic structures in the metallographic sample;
select a portion of the image;
perform morphological operations on the selected portion of the image to transform the image;
overlay a plurality of concentric circles on the transformed image;
measure circumferences of the circles;
count the number of intercepts of the circles and boundaries of the dendritic structures in the transformed image;
determine parameters of the dendritic structures based on the measured circumferences and the number of intercepts; and
determine structural properties of the product based on the parameters of the dendritic structures.

12. The system of claim 11 wherein a process used to manufacture the product is selectively adjusted based on the determined structural properties.

13. The system of claim 11 wherein a composition of material used to manufacture the product is selectively adjusted based on the determined structural properties.

14. The system of claim 11 wherein the computing device is configured to determine the parameters independent of the magnifications of the microscopes.

15. The system of claim 11 wherein the computing device is configured to determine the parameters independent of the resolutions of the cameras.

16. The system of claim 11 wherein the computing device is configured to adjust one or more of the circumferences based on a distribution of the dendritic structures in the selected portion of the image.

17. The system of claim 11 wherein the parameters include a dendritic cell spacing for the metallographic sample and wherein the computing device is configured to determine the dendritic cell spacing by dividing a sum of the circumferences by the number of intercepts.

18. The system of claim 11 wherein the parameters include a mean linear dendritic spacing for the metallographic sample and wherein the computing device is configured to determine the mean linear dendritic spacing based on the circumferences and the number of intercepts.

19. The system of claim 17 wherein the parameters include a mean linear dendritic spacing for the metallographic sample and wherein the computing device is configured to determine the mean linear dendritic spacing based on the dendritic cell spacing.

20. The system of claim 17 wherein the parameters include a mean linear dendritic spacing for the metallographic sample and wherein the computing device is configured to determine the mean linear dendritic spacing based on the dendritic cell spacing and an area of the selected portion of the image.

* * * * *